(12) United States Patent
Lee

(10) Patent No.: US 9,451,788 B2
(45) Date of Patent: Sep. 27, 2016

(54) STORAGE APPARATUS FOR IMPROVING FOOD PRESERVATION

(71) Applicant: Seung Won Lee, Daejeon (KR)

(72) Inventor: Seung Won Lee, Daejeon (KR)

( * ) Notice: Subject to any disclaimer, the term of this patent is extended or adjusted under 35 U.S.C. 154(b) by 205 days.

(21) Appl. No.: 14/361,200

(22) PCT Filed: Mar. 6, 2013

(86) PCT No.: PCT/KR2013/001801
§ 371 (c)(1),
(2) Date: May 28, 2014

(87) PCT Pub. No.: WO2013/137586
PCT Pub. Date: Sep. 19, 2013

(65) Prior Publication Data
US 2014/0311359 A1    Oct. 23, 2014

(30) Foreign Application Priority Data

Mar. 16, 2012  (KR) .................. 10-2012-0027073
Jun. 29, 2012  (KR) .................. 10-2012-0070410

(51) Int. Cl.
   *A23C 3/07*    (2006.01)
   *A23L 3/00*    (2006.01)
   *A23L 3/26*    (2006.01)
   *A23B 7/015*   (2006.01)

(52) U.S. Cl.
   CPC . *A23L 3/26* (2013.01); *A23B 7/015* (2013.01)

(58) Field of Classification Search
   CPC .................................. A23L 3/26; A23B 7/015
   USPC .......................................................... 99/451
   See application file for complete search history.

(56) References Cited

U.S. PATENT DOCUMENTS

| 5,253,488 A * | 10/1993 | Kim ...................... A23L 3/3427 312/402 |
| 7,905,614 B2 * | 3/2011 | Aoki ....................... F25D 11/02 312/116 |
| 2004/0021810 A1 * | 2/2004 | Kawaguri ................ G02B 5/08 349/113 |
| 2008/0066475 A1 * | 3/2008 | Cho .......................... A23L 3/26 62/130 |
| 2008/0070229 A1 * | 3/2008 | Streeter ..................... A01N 1/02 435/1.1 |
| 2013/0337121 A1 * | 12/2013 | Sugano ................... A23B 4/015 426/232 |
| 2014/0368103 A1 * | 12/2014 | Son ......................... F25D 29/00 312/401 |

FOREIGN PATENT DOCUMENTS

| JP | 2005-065622 A | 3/2005 |
| JP | 2009-000054 A | 1/2009 |
| JP | 2009-027970 A | 2/2009 |
| KR | 10-0761356 B1 | 9/2007 |

(Continued)

*Primary Examiner* — Dana Ross
*Assistant Examiner* — Lindsey C Teaters
(74) *Attorney, Agent, or Firm* — Novick, Kim & Lee, PLLC; Jae Youn Kim

(57) ABSTRACT

Disclosed a preservation apparatus for improving food storage performance, in which an illumination unit to irradiate light having a specific wavelength is installed on an inner wall surface of a box having foods stored therein to increase the storage period of the foods when the foods are transferred at a room temperature or stored at a low temperature. The foods are prevented from being decayed for a long time, and the nutrients and the freshness of the foods are maintained. The box having the foods stored therein and the illumination unit installed in the box to irradiate light having the specific wavelength onto the foods stored in the box are included.

7 Claims, 19 Drawing Sheets

(56) References Cited

FOREIGN PATENT DOCUMENTS

| KR | 10-2007-0098422 A | 10/2007 | | |
|----|-------------------|---------|----|----|
| KR | WO 2007136171 A1 * | 11/2007 | ............ | A23B 7/015 |
| KR | 10-0846215 B1 | 7/2008 | | |
| KR | 10-2011-0055811 A | 5/2011 | | |

* cited by examiner

US 9,451,788 B2

STORAGE APPARATUS FOR IMPROVING FOOD PRESERVATION

TECHNICAL FIELD

The present invention relates to a preservation apparatus for improving food storage performance, and more particularly, to a preservation apparatus for improving food storage performance, in which an illumination unit to irradiate light having a specific wavelength is installed on an inner wall surface of a box having foods stored therein to increase the storage period of the foods when the foods are transferred at a room temperature or stored at a low temperature.

BACKGROUND ART

In general, as time goes on after foods have been stored in a box, nutrients of the foods are gradually destroyed, and the freshness of the foods may be degraded.

In order to solve the above problem, foods may be put into a food box and ultraviolet rays may be irradiated onto the foods, or the foods may be individually packaged, or may be kept refrigerated.

However, when the ultraviolet rays may be irradiated onto the foods or the foods are individually packaged, the freshness and the nutrients of the foods may be maintained only for a very short time, and the foods may be spoiled if a predetermined time elapses. However, when the foods are kept refrigerated, although the foods may be stored for a long time, most of nutrients may be destroyed.

As related arts, there are Korean Unexamined Patent Publication No. 10-2007-0098422 and Korean Patent Registration No.

DISCLOSURE

Technical Problem

The present invention provides a preservation apparatus for improving food storage performance, in which an illumination unit to irradiate light having a specific wavelength is installed on an inner wall surface of a box having foods stored therein to increase a storage period when the foods are transferred at a room temperature or stored at a low temperature, thereby preventing the foods stored for a ling time from being decaying and maintaining the nutrients and the freshness of the foods.

The objects of the present invention are not limited to the above-mentioned objects, and other objects, which are not described, can be clearly comprehended from the following description by those skilled in the art.

Technical Solution

In other to accomplish the object of the present invention, according to one aspect of the present invention, there is provided a preservation apparatus for improving food storage performance. The preservation apparatus includes a box in which foods are stored, and an illumination unit inserted and installed into the box to irradiate light having a specific wavelength onto the foods stored in the box.

In detail, the illumination unit may include an LED to irradiate the light having the specific wavelength into the box, a battery connected with the LED to apply power to the LED, and a switch connected between the battery and the LED to cut off power.

The illumination unit simultaneously may irradiate the light onto foods stored at upper and lower portions of the box as a separator is provided at an intermediate portion of the box to separate the foods at the upper portion of the box from the foods at the lower of the box.

The illumination unit may be provided in a shape of a stripe or a triangular horn piece and attached to an inner wall surface or a corner of the box.

The preservation apparatus may further include a reflective member provided in an inner wall of the box and including a reflective material to diffusion-reflect the light from the illumination unit.

The illumination unit may be inserted into an inner wall surface of the box and integrated with the box.

According to another aspect of the present invention, there is provided a preservation apparatus for improving food storage performance. The preservation apparatus may include an illumination unit inserted and installed into a box to irradiate light having a specific wavelength onto foods stored in the box, a reflective member coupled with an inner front surface of the box through insertion into the box, having a plurality of reflective protrusions to diffusion-reflect the light from the illumination unit, and including a reflective material, and a plurality of separators crossing an intermediate portion of the box to divide the foods stacked in the box into upper foods and lower foods and including a reflective material to reflect the light from the illumination unit.

In detail, the box may be provided in both lateral sides thereof with transmission holes, and the transmission holes may be coupled with films such that the light having the specific wavelength is transmitted into the box.

The illumination unit may include an LED to irradiate the light having the specific wavelength into the box, a solar cell installed at an outer surface of the box to generate power by using sunlight, a battery to apply power to the LED and charged with the power generated from the solar cell, a display unit to display an operating state of the LED, a control unit connected with the LED, the display unit, the solar cell, and the battery to operate the LED and the display unit by using a set value, and a switch connected with the control unit to transmit an external input to the control unit.

The preservation apparatus may further include a reflective plate provided at a front surface of the LED to reflect the light such that the light is irradiated to a lateral side.

The illumination unit may be provided in a shape of a stripe or a triangular horn piece and attached to an inner wall surface or a corner of the box.

The reflective protrusions of the reflective member may be provided in a polygonal shape, a circular shape, or an oval shape when viewed in a plan view, and provided in a parallelogram shape when viewed in a side sectional view to prevent the foods from being damaged.

The light from the illumination unit may have a wavelength in a range of 320 nm to 850 nm.

In addition, an optical cable may be connected with the illumination unit such that the light from the illumination unit is supplied to the foods positioned into the box and irradiated onto the foods.

Advantageous Effects

As described above, according to the present invention, when the foods stored in the box are transferred or preserved, the illumination unit is installed on the inner wall surface of the box in order to improve the storage performance of the foods, so that the storage performance of the foods can be improved by light having the specific wavelength and irradiated from the illumination unit.

BEST MODE

Mode for Invention

Figure 1:
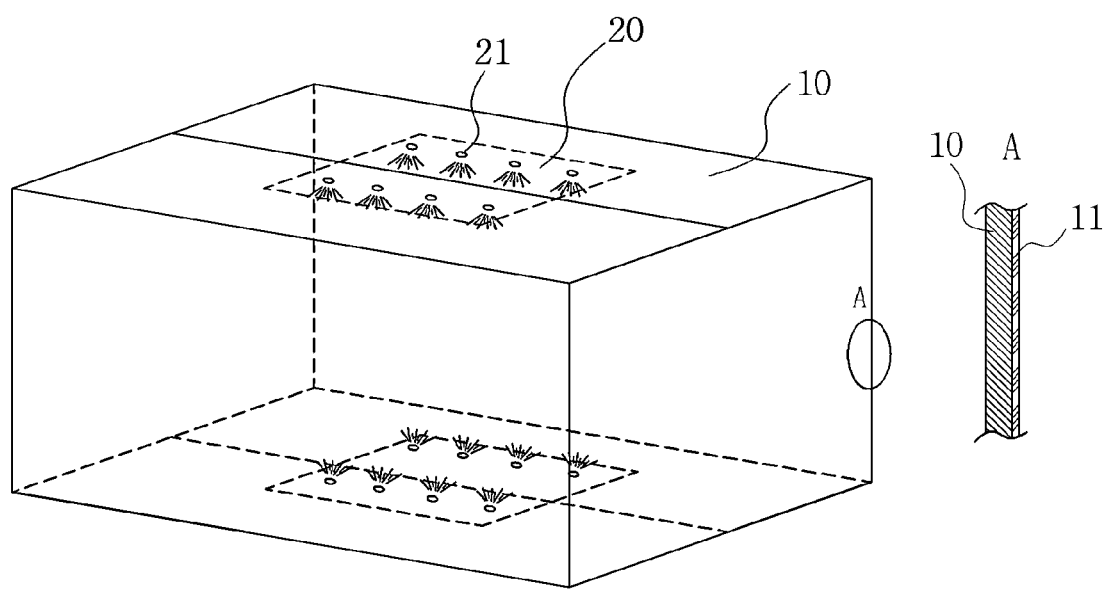
FIG. 1 is a view showing the whole structure of a preservation apparatus for improving food storage performance according to the embodiment of the present invention.

Hereinafter, an exemplary embodiment of the present invention will be described with reference to accompanying drawings. In the following description, the same reference numerals will be assigned to the same elements. In addition, the details of the generally-known technology that makes the subject matter of the present invention unclear will be omitted in the following description.

FIG. 1 is a perspective view showing a preservation apparatus for improving food storage performance according to the embodiment of the present invention, which includes a box 10 having foods stored therein, an illumination unit 20 to irradiate light having a specific wavelength, and a reflective member 11 installed on an inner wall surface of the box 10.

The box 10 has foods stored therein, and includes an opaque material so that light is not transmitted into the box 10.

In this case, the box 10 is sealed by a handle, which may be formed on the box 10, so that light is not introduced into the box 10.

Regarding to an inner wall surface of the box 10, the reflective member 11 including a reflective material is formed in the shape of the inner wall surface of the box 10 and bonded to the inner wall surface of the box 10.

Accordingly, the light irradiated from the illumination unit 20 into the box 10 is diffusion-reflected by the reflective member 11, so that the light can be uniformly irradiated onto the foods stored in the box 10.

Figure 2:
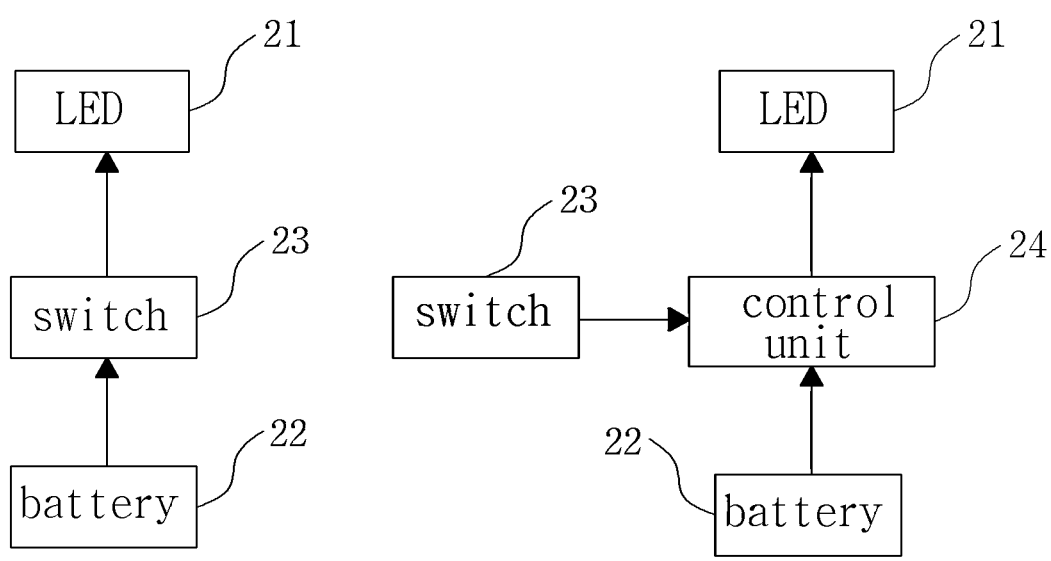
FIG. 2 is a block diagram showing an illumination unit in the preservation apparatus for improving food storage performance according to the embodiment of the present invention.

As shown in FIG. 2, the illumination unit 20 includes a light emitting device (LED) 21, a battery 23, and a switch 22.

The LED 21 irradiates the light having a specific wavelength into the box 10. The LED 21 includes an SMD type of LED to occupy the minimum space, so that the LED 21 is prevented from colliding with the foods stored in the box 10.

This is because the foods are damaged if the LED 21 collides with the foods, so that the value of the foods may be lowered.

The specific wavelength of the light irradiated from the LED 21 may be in the range of 320-850 nm.

Preferably, the specific wavelength of the LED 21 is in the range of 420-680 nm.

The battery 23 is connected with the LED 21, and the switch 22 is connected between the battery 23 and the LED 21 to operate the LED 21. Similarly to the LED 21, the battery 23 and the switch 22 occupy the minimum space and have the minimum sizes so that the battery 23 and the switch 22 do not collide with the foods stored in the box 10.

In addition, the battery 23, the switch 22, and the LED 21 may have large sizes for the use thereof.

A control unit 24 is connected with the illumination unit 20 including the LED 21, the switch 22, and the battery 23 to control the LED 21, so that the LED 21 may be repeatedly turned on/off at a predetermined period of time.

An optical cable is connected with the illumination unit 20 so that light may be transmitted and irradiated to an inner region of the box 10, which the light generated from the illumination unit 20 does not reach, through the optical cable.

In addition, since the light from the illumination unit 20 may be transmitted to a long distance through the optical cable, the number of illumination units 20 may be reduced to a minimum, so that only the minimum number of the illumination units 20 may be installed and used.

Figure 3:
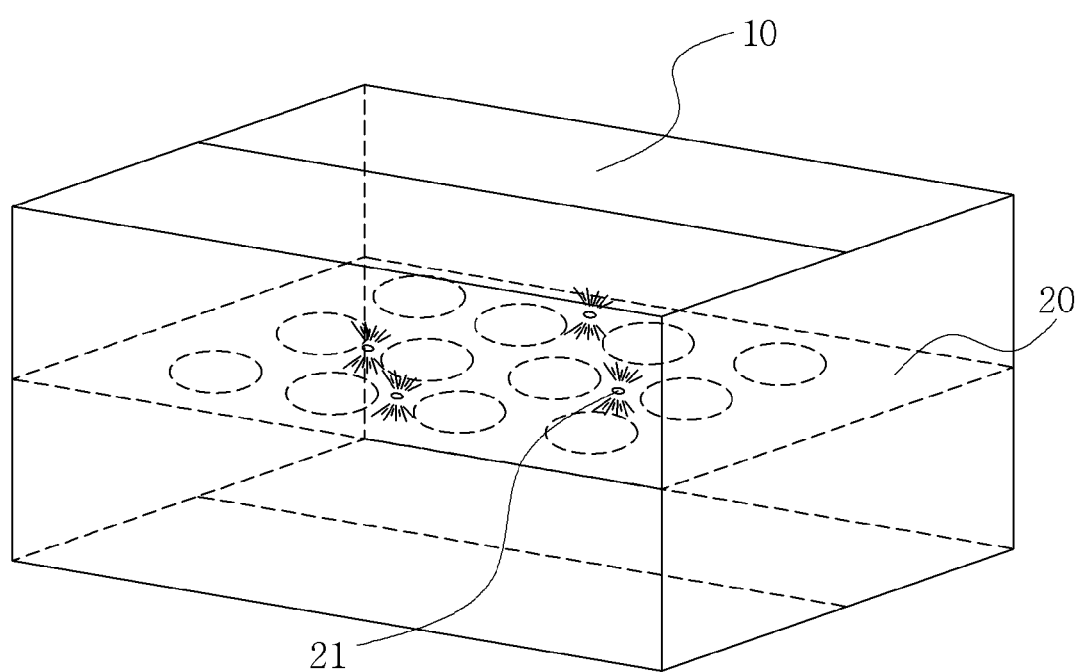
FIG. 3 is a view showing that the illumination unit according to the present invention is provided in the form of a shielding plate.

As shown in FIG. 3, the illumination unit 20 is provided in the shape of a separator, a stripe, or a triangular horn piece, so that the illumination unit 20 may be installed on the inner wall surface or at the corner of the box 10.

Figure 4:
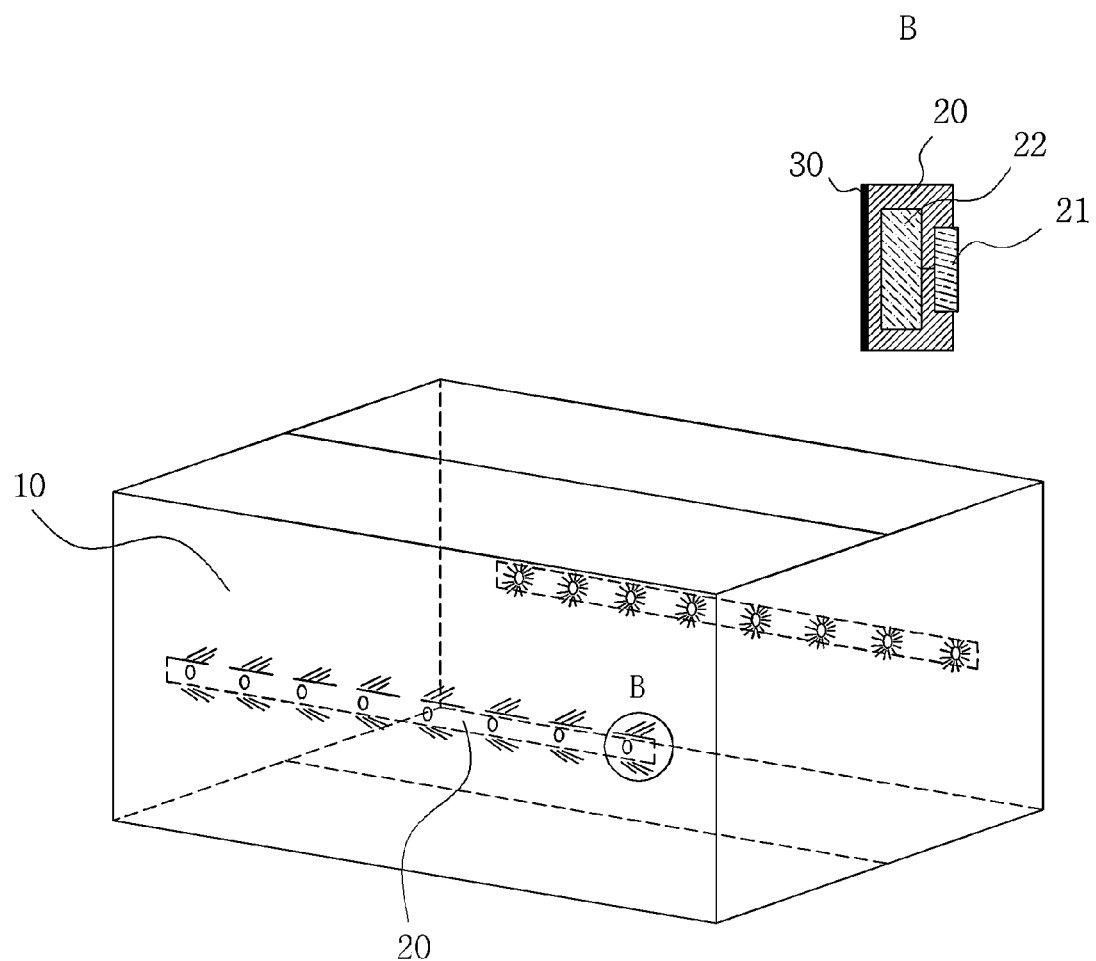
FIG. 4 is a view showing that the illumination unit according to the present invention is provided in the shape of a stripe.

If the illumination unit 20 is provided in the shape of the separator, the illumination unit 20 irradiates light from an intermediate portion of the box 10 having foods stored therein to foods stored at upper and lower compartment about the separator As shown in FIG. 4, if the illumination unit 20 is provided in the shape of a stripe, the LED 21, the battery 23 and the switch 22 are modularized to have the shape of the stripe. Accordingly, a plurality of LEDs 21, batteries 23, and switches 22 may be attached to the ceiling, the floor, and the wall surfaces of the box 10.

If the LED 21, the battery 23, and the switch 22 constituting the illumination unit 20 are provided in the shape of a thin stripe as described above, an adhesive layer 30 is formed at a portion of the illumination unit 20 attached to the box 10, so that the illumination unit 20 may be attached to the box 10.

Figure 5:
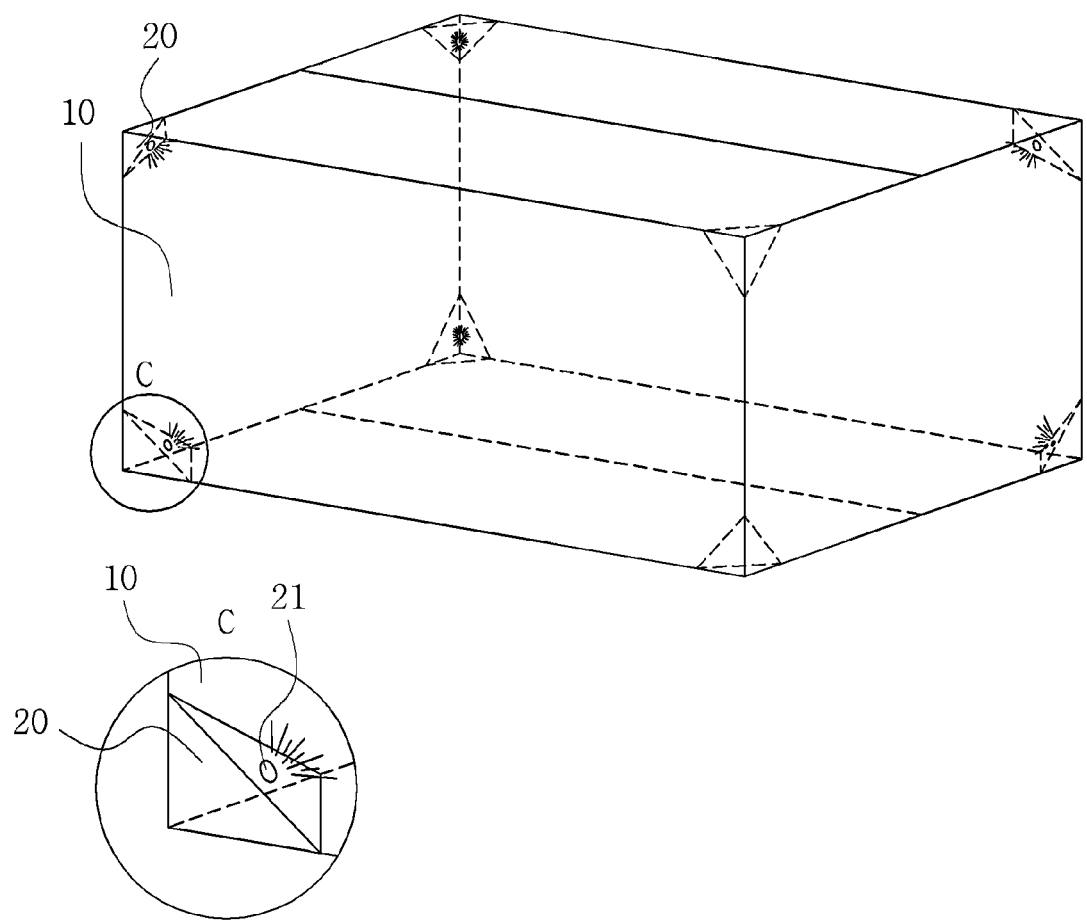
FIG. 5 is a view showing that the illumination unit according to the present invention is provided in the shape of a triangular horn piece.

As shown in FIG. 5, if the illumination unit 20 is provided in the shape of a triangular horn piece, the illumination unit 20 is installed at each corner of the box 10 to irradiate light into the box 10.

Figure 6:
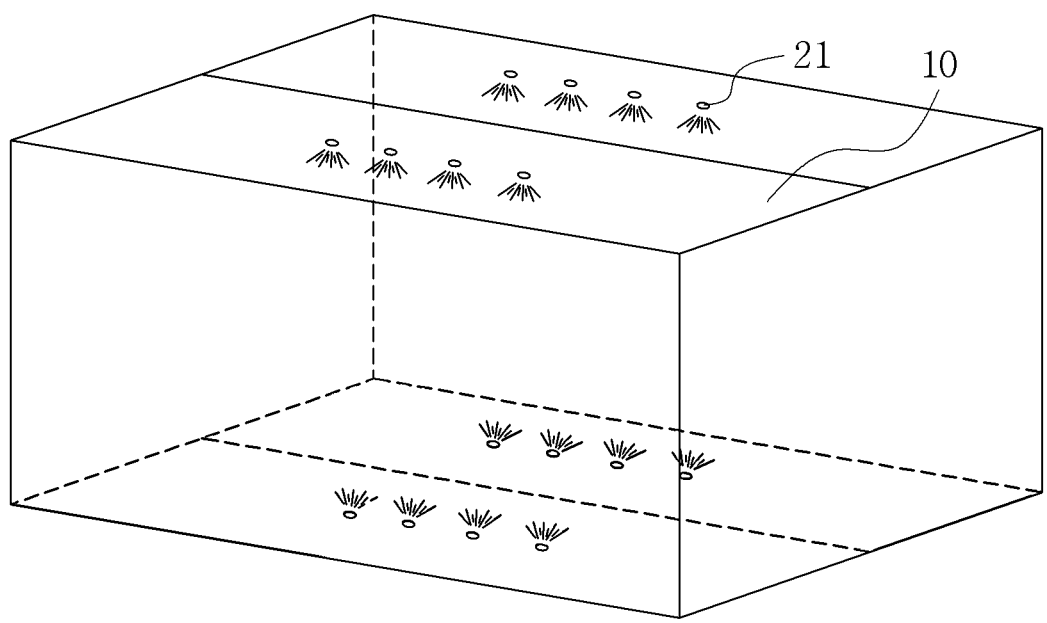
FIG. 6 is a view showing that the illumination unit according to the present invention is provided integrally with a box.

As shown in FIG. 6, when the box 10 is manufactured, the illumination unit 20 is inserted into the inner wall surface of the box 10, so that the illumination unit 20 may be integrally formed with the box 10. If the illumination unit 20 is formed integrally with the box 10 as described above, the switch 22 of the illumination unit 20 may be installed on a cover of the box 10 so that the illumination unit 20 is operated when the foods are put into the box 10 and the box 10 is covered.

In this case, since the box 10 must be reused, the box 10 represents stronger endurance than that of a typical box, and the battery 23 is replaced with new one.

As described above, although the illumination unit 20 is not manufactured integrally with the box 10, since the illumination unit 20 may be reused, the illumination unit 20 is manufactured in such a manner that the battery 23 of the illumination unit 20 is replaced with new one.

In addition, the illumination unit 20 is formed similarly to a wrapping paper, so that the foods may be individually packaged by the illumination unit 20 and prevented from being exposed to external light.

Following results are obtained after a predetermined time elapses from when tomatoes, which are solanaceae plants, are stored in the box having the above configuration.

The LED 21 irradiating the specific wavelength may include a blue LED 21 irradiating the wavelength of 440 nm, a white LED 21 irradiating the wavelength of 470 nm, and the red LED 21 irradiating the wavelength of 660 nm.

Tomatoes are stored in the preservation apparatus for improving food storage performance according to the present invention, and the freshness of the tomatoes is examined according to the lapse of dates while irradiating lights having various wavelengths from the LEDs.

Figure 7:
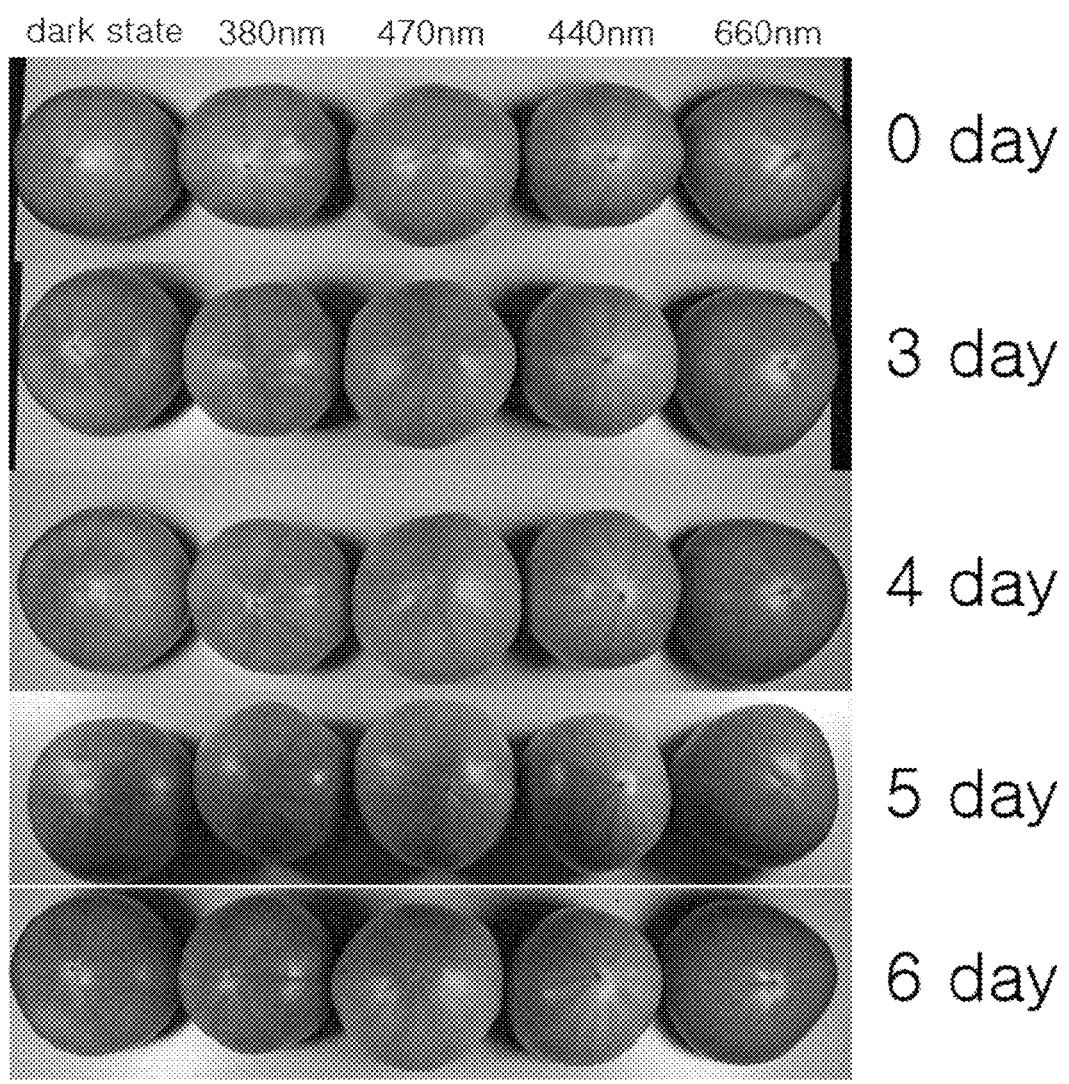
FIG. 7 is a view showing the change in colors of tomatoes receiving light from an LED as days elapse (380 nm: UV lamp, 470 nm: white lamp, 440 nm: blue lamp, and 660 nm: red lamp).
Figure 8:
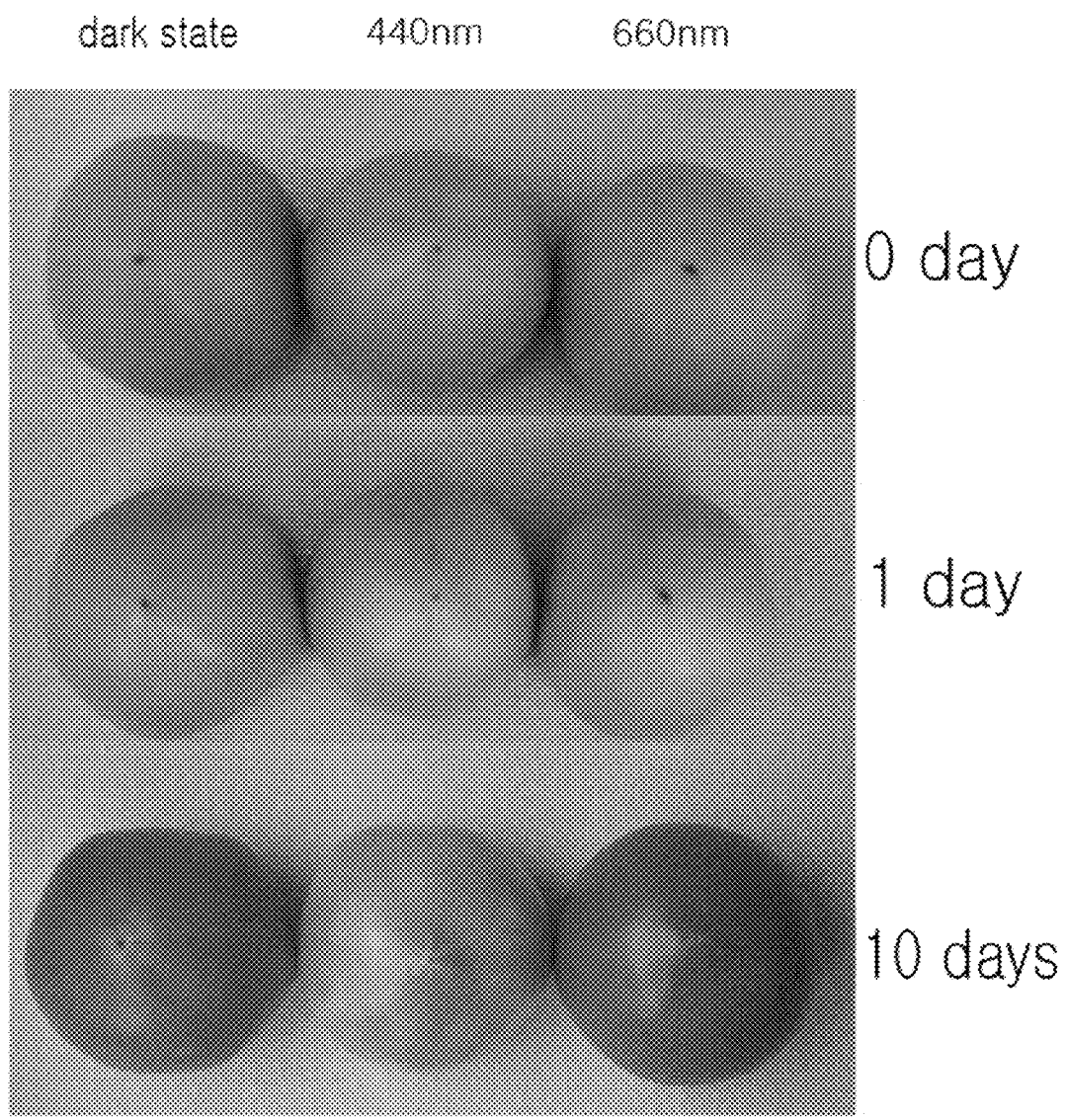
FIG. 8 is a view showing the change in colors of tomatoes receiving light from an LED as days elapse in brief (440 nm: blue lamp, and 660 nm: red lamp).

Accordingly, as the predetermined time elapses as shown in FIGS. 7 and 8, the colors of the tomatoes are changed. In the case of the LED 21 irradiating the wavelength of 380 nm in a dark chamber, the colors of the tomatoes are irregularly changed. In the case of the blue LED 21 irradiating the wavelength of 440 nm and the white LED 21 irradiating the wavelength of 470 nm, the change in the colors of the tomatoes is lowered, so that the preservation time of the tomatoes can be increased.

In the case of the red LED 21 irradiating the wavelength of 660 nm, the change in the colors of the tomatoes is accelerated, so that the colors of the tomatoes are uniformly changed.

It can be recognized from the results that the freshness of the tomatoes can be maintained for a long time in the case of the blue and white LEDs 21 irradiating the light having the wavelengths of 440 nm to 470 nm.

Next, Hyaward kiwifruits were stored in the preservation apparatus for improving food storage performance according to the present invention, lights having various wavelengths are irradiated from the LEDs, and various characteristics of the Hyaward kiwifruits were examined according to the lapse of the time.

1. Material and Method (1) Experimental Material

In the experiment, Hyaward kiwifruits, which were cultivated in Namhae, Gyeongsangnamdo, Korea at November, 2009, and stored in a cold storage at the temperature of 0-1° C., were used as the experimental materials.

(2) Irradiation of LED

Figure 9:
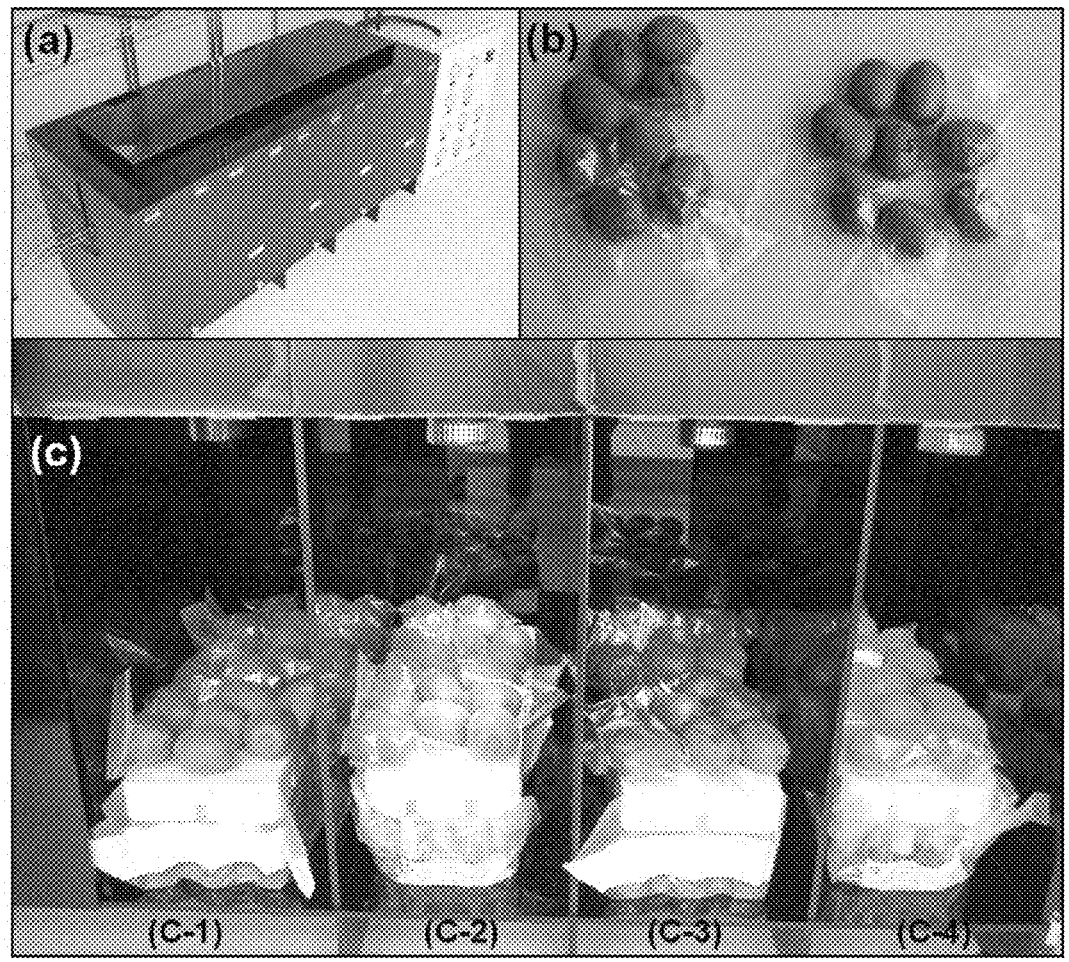
FIG. 9 shows an LED (see (a)), photographs of sealed kiwifruits and unsealed kiwifruits subject to pre-treatment (see (b)), and kiwifruits under the LED (see (c)) (C-1: 380 nm UV lamp, C-2: 470 nm white lamp, C-3: 440 nm blue lamp, and C-4: 660 nm red lamp).

Lights having various wavelengths were irradiated from the LEDs in the preservation apparatus for improving food storage performance according to the present invention (see FIG. 9-$a$).

Hyaward kiwifruits were classified into kiwifruits to be put into a plastic bag and sealed a treatment group of kiwifruits that were unsealed (see FIG. 9-$b$). As shown in FIG. 9, regarding the LED 21, black acrylic plate chambers were manufactured in size of 24 cm×50 cm×60 cm, two bulbs were installed in the chambers separated from each other, respectively, to irradiate light. The kiwifruits serving as the experimental material were positioned on a mounting plate at the height of 15 cm (see FIG. 9-$c$).

In this case, the box was formed by using the black acrylic plate in order to make an environment similar to that of the sealed box according to the present invention.

The LED 21 includes a 380 nm UV lamp, a 440 nm blue lamp, a 470 nm white lamp, and a 660 nm red lamp. The LED 21 continuously irradiated lights having various wavelengths to the kiwifruits through the above lamps for 7 days or 14 days. As control groups, kiwifruits stored in a refrigerator maintained at the temperature of 4° C., and kiwifruits provided at a dark state in a constant temperature humidity chamber were used.

(3) Measurement of after-Ripening Degree of Kiwifruits

The firmness and the acidity of the kiwifruits that had received lights having various wavelengths were measured in a first week or a second week at the normal temperature of 25±2° C.

(3-1) Measurement of Firmness

The firmness of the kiwifruits was measured by using Texture analyzer (TA-XT2/25, Stable Mi18 cro System Co.

Ltd., Surrey, England). The experimental materials were introduced into the texture analyzer continuously twice by a P/5 (φ5 mm) plunger.

Under the analysis condition of the pre test speed of 2.0 mm/sec, the test speed of 1.0 mm/sec, the post test speed of 2.0 mm/sec, strain of 70%, and the force of 5 kg, a kiwifruit was peeled and cut by the thickness of 1 cm for the measurement thereof.

(3-2) Measurement of Acidity

Regarding the measurement of acidity, the acidity of the kiwifruit was measured by extracting 10 ml of fruit juice from the kiwifruit through filtration, mixing the extracted solution with 40 mL of distilled water, titrating the mixture to the acidity of pH 8.2 by using a 0.1N NaOH solution through a pH meter (Model No. 720, Orion, Japan), and changing the acidity of the mixture based on citric acid.

Embodiment 1

Firmness of Kiwifruit According to LED Wavelength

Figure 10:
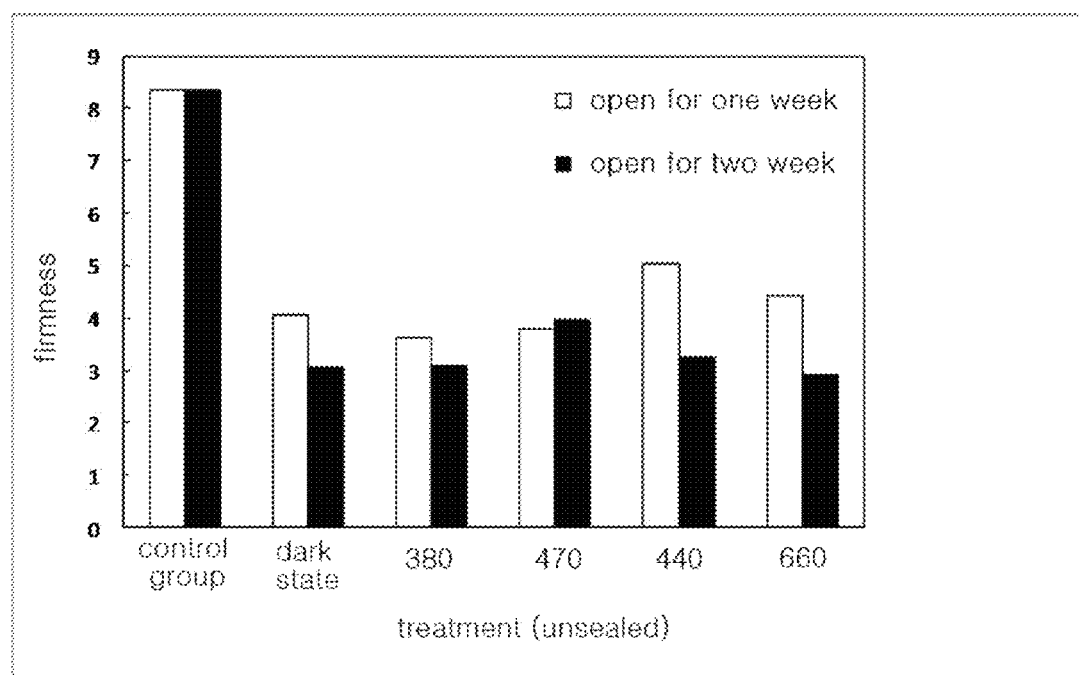
FIG. 10 is a graph that the firmnesses of unsealed kiwifruits according to LED wavelengths are measured after one week or two weeks and compared (control: stored at the temperature of 4° C., Dark: stored in a dark state, and Light: subject to the wavelength of 470 nm).
Figure 11:
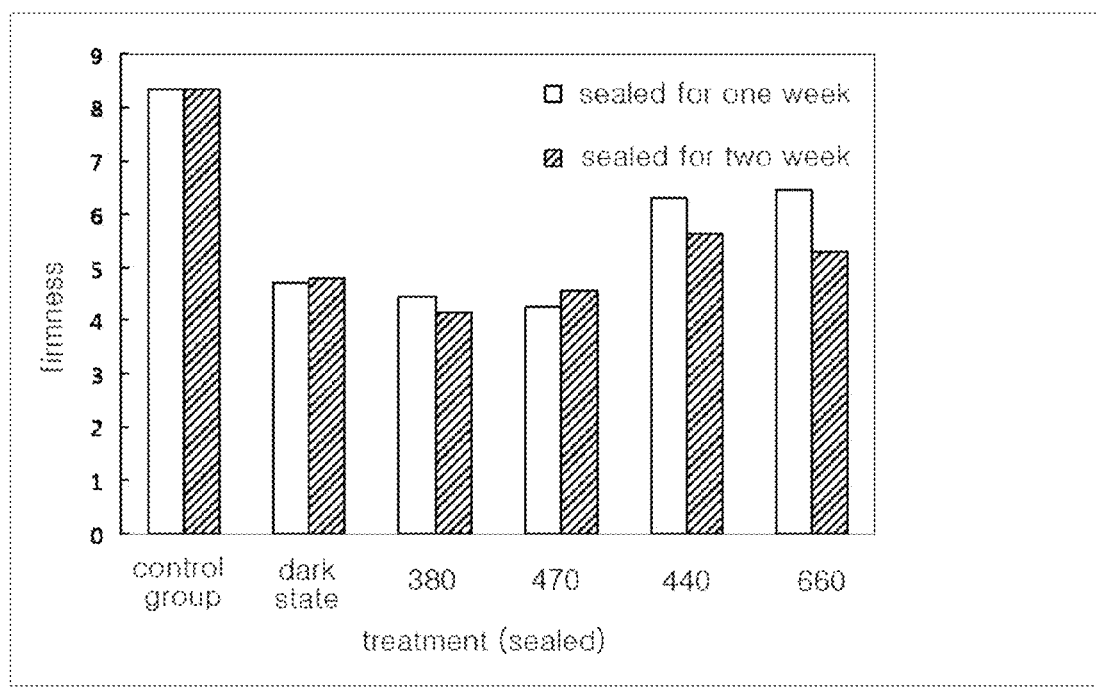
FIG. 11 is a graph that the firmnesses of sealed kiwifruits according to LED wavelengths are measured after one week or two weeks and compared (control: stored at the temperature of 4° C., Dark: stored in a dark state, and Light: subject to the wavelength of 470 nm).

Regarding the firmness of the kiwifruits, the kiwifruits represented lower firmness when the kiwifruits were exposed to the air (see FIG. 10) at the temperature of 25° C. or sealed (See FIG. 11) as compared with when the kiwifruits were stored at the temperature of 4° C. The firmness of a treatment group of kiwifruits opened or sealed and after-ripened in a dark chamber at the temperature of 25° C. was about 5% lower than that of a control group of kiwifruits stored at the temperature of 4° C. after one week has elapsed.

On the assumption that kiwifruits was not sealed and stored since the firmness of the kiwifruit is affected by wavelengths, the firmness of the kiwifruit subject to the treatment of the LEDs 21 having the wavelengths 440 nm and 660 nm was higher than the firmness of kiwifruit provided in a dark chamber by 25% and 11%, respectively.

When kiwifruits are stored in an unsealed state under a 380 nm UV lamp and a 470 nm white lamp, the firmnesses of the kiwifruits under the 380 nm UV lamp and the 470 nm white lamp were decreased by about 9.4% and about 5.3%, respectively, as compared with the hardness kiwifruit provided in the dark chamber.

After two weeks, other than kiwifruits in the dark chamber and under white light having the wavelength of 470 nm, the firmnesses of kiwifruits subject to the treatment of all LED wavelengths were decreased as compared with the firmnesses of the control group or a one-week treatment group. This is because kiwifruits start to be decayed after the peak point of after-ripening. The kiwifruits stored in a sealed state represent higher firmness when the kiwifruits are provided in a dark chamber and subject to various wavelengths from the LED 21 as compared with when the kiwifruits are exposed to the air (see FIG. 11).

Embodiment 2

Acidity of Hayward Kiwifruits According to LED Wavelengths

Figure 12:
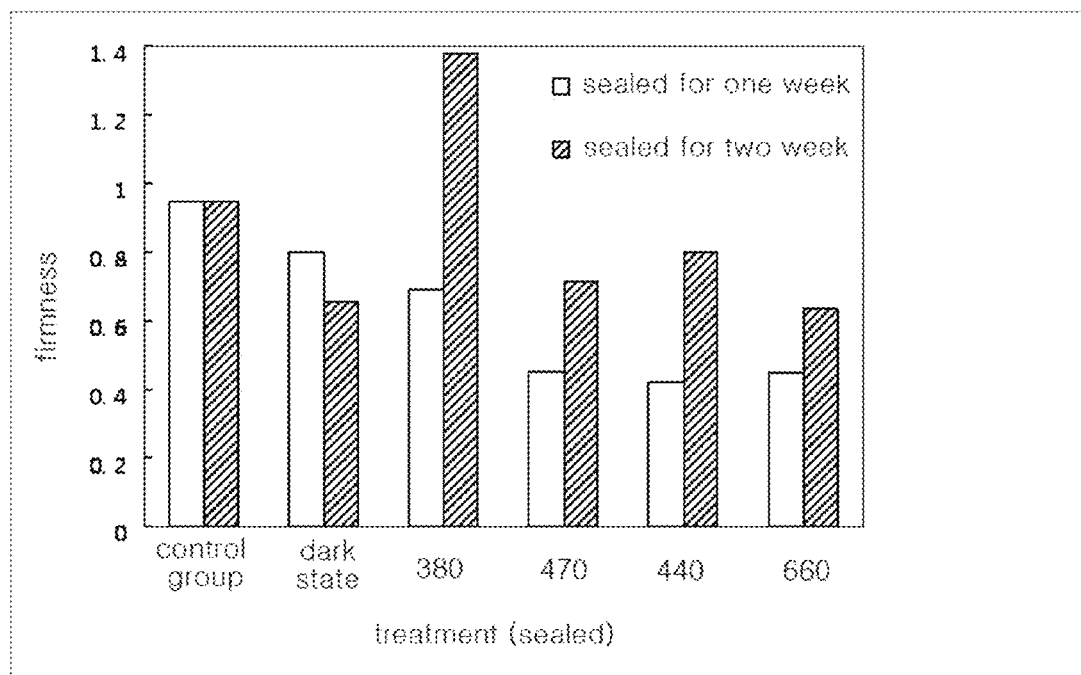
FIG. 12 is a graph that the acidities of sealed kiwifruits according to LED wavelengths are measured after one week or two weeks and compared (control: stored at the temperature of 4° C., Dark: stored in a dark state, and Light: subject to the wavelength of 470 nm).

It was observed that the decrease in the acidity of sealed Hayward kiwifruits was accelerated due to the irradiation of lights from the LED 21. When lights are irradiated onto the kiwifruits from the 470 nm white LED 21, the 440 nm blue LED 21, and the 660 nm red LED 21, the acidity of the kiwifruits was decreased more than the acidity of the control group by 52.6%, 55.6%, and 52.8% (see FIG. 12).

Hereinafter, a method of packaging foods into the box 10 by using the present invention configured as described will be described.

Holes of the box 10 are shielded so that external light is not introduced into the box 10 used to package the foods, and a reflective member 11 having the same shape as that of the inner wall surface of the box 10 is bonded to the inner wall surface of the box 10.

Further, in the state that the illumination unit 20 is installed in the reflective member 11 and operated, the foods are put into the box 10. If the illumination unit 20 has the shape of a separator, the foods are put into the box 10, and the separator is covered on the put foods before other foods are additionally put on the foods. Then, foods are additionally put on the separator.

If the foods are put into the box 10 through the above process, the box 10 is sealed so that external light is not introduced into the box 10.

If the illumination unit 20 is provided in the shape of a stripe or the triangular horn piece, the illumination unit 20 is bonded to the box 10 through the adhesive layer 30.

Another embodiment of the present invention is as follows.

Figure 13:
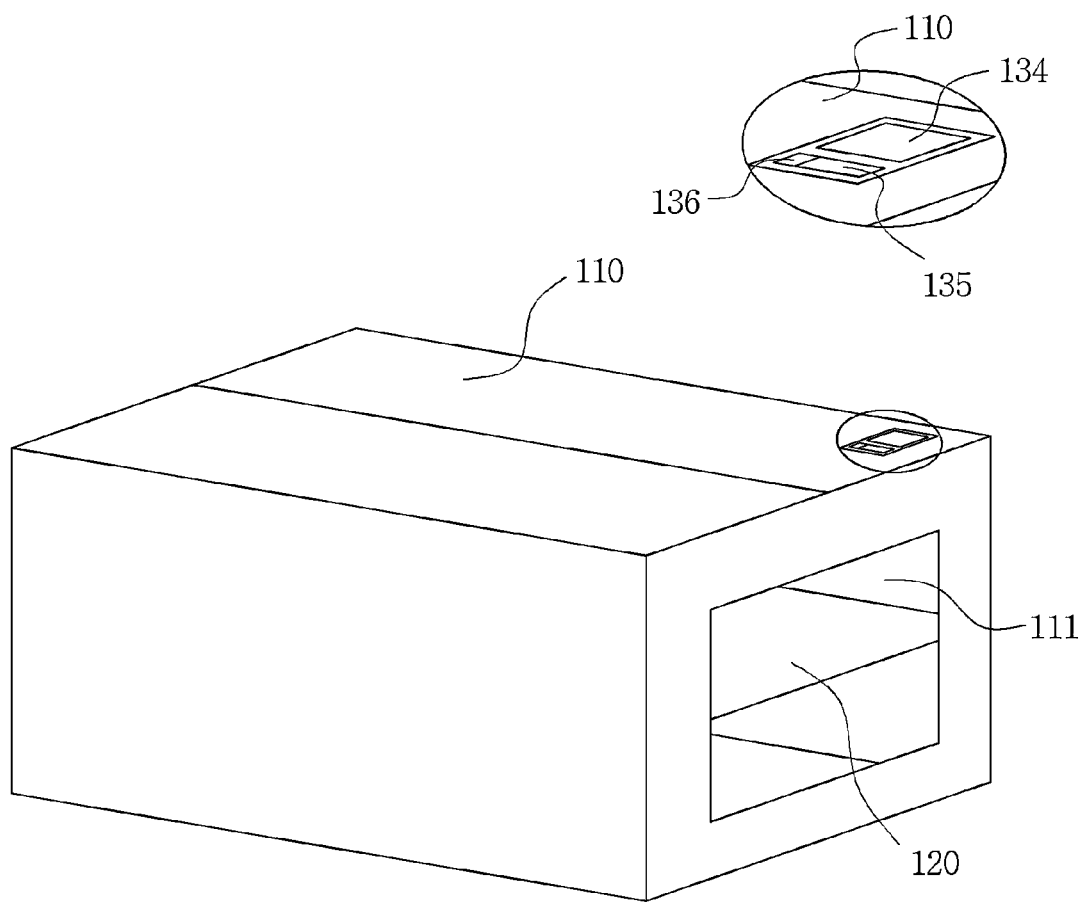
FIG. 13 is a view showing the whole structure of a preservation apparatus for improving food storage performance according to another embodiment of the present invention.
Figure 14:
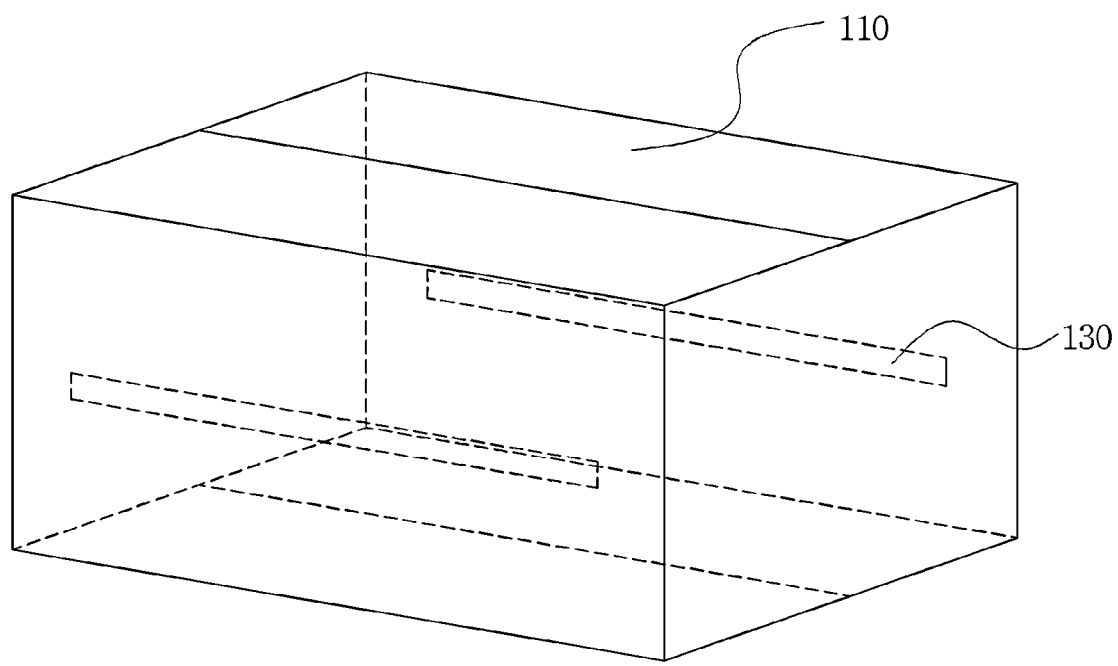
FIG. 14 is a view showing that an illumination unit is provided in the shape of a stripe in the preservation apparatus for improving food storage performance according to another embodiment of the present invention.
Figure 15:
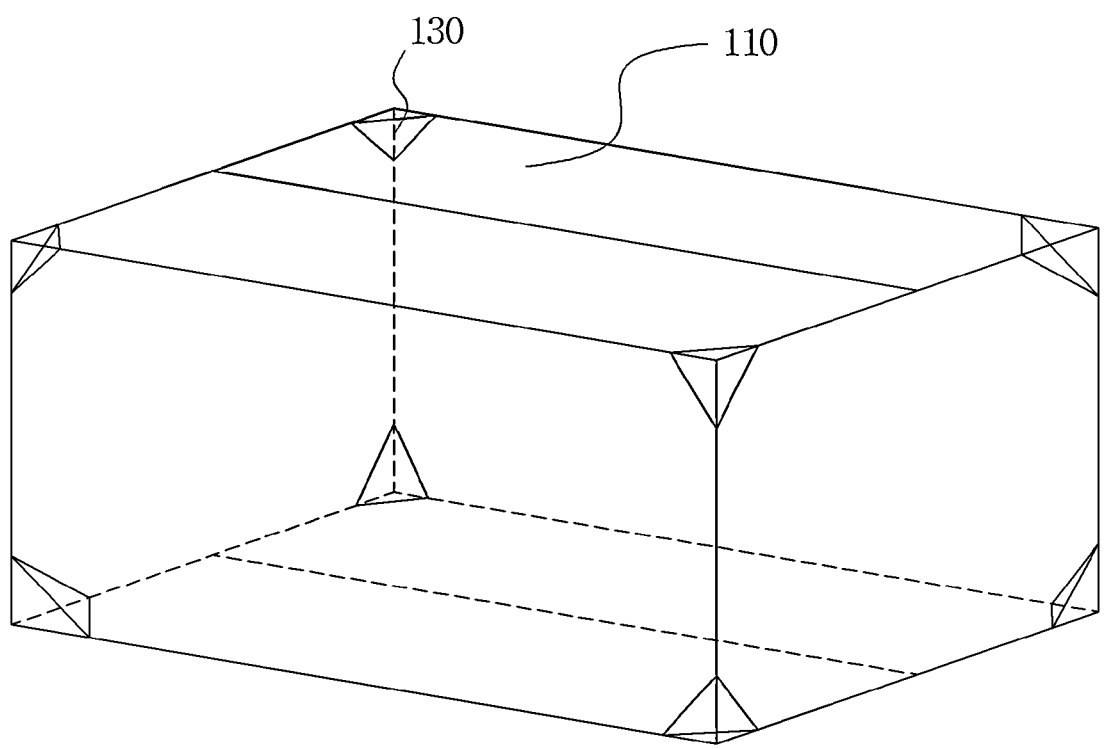
FIG. 15 is a view showing that an illumination unit is provided in the shape of a triangular horn in the preservation apparatus for improving food storage performance according to another embodiment of the present invention.

FIGS. 13 to 15 are views showing a preservation apparatus for improving food storage performance according to another embodiment of the present invention, which includes a box 110 to store foods so that the foods are transferred or stored at a room temperature or a low temperature, an illumination unit 130 to irradiate light onto the foods stored in the box 110, a reflective member 140 including a reflective material and inserted into the box 110 for the coupling with the box 110, and a plurality of separators 120 installed at an intermediate portion of the box 110.

The box 110 is made of paper, woods, or a plastic material so that the foods can be stored therein. In addition, general boxes 110 may be used. In addition, for continuous recycling, the box 110 may have stiffness stronger than that of the general box 110.

As shown in FIG. 13, the box 110 is provided in both lateral sides thereof with transmission holes in a longitudinal direction of the box 110 and the transmission holes are coupled with films so that only external light having a specific wavelength and irradiated to the foods is transmitted and irradiated into the box 110.

The film transmits only the light having the wavelength of 350-700 nm.

Since the film transmits only the light having the specific wavelength into the box 110, the illumination unit 130 may not be operated if the external light is irradiated.

Figure 16:
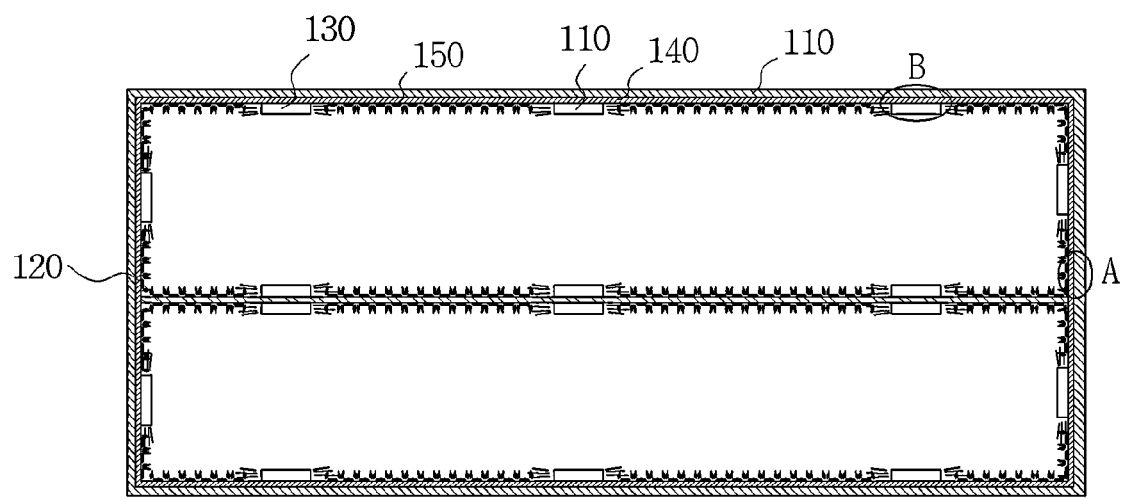
FIG. 16 is a sectional view showing the whole structure of a preservation apparatus for improving food storage performance according to another embodiment of the present invention.

As shown in FIG. 16, a reflective member 140 having the same shape as the inner wall surface of the box 10 and including the same material as that constituting the inner wall surface of the box 10 are inserted into the whole inner wall surface of the box 110.

The reflective member 140 has a plurality of reflective protrusions 150 protruding inward of the box 110 to diffusion-reflect light irradiated from the illumination unit 130.

The reflective protrusion 150 has a circular shape, an oval shape, or a polygonal shape when viewed in a plan view, and has a parallelogram shape when viewed in a side sectional view, so that the reflective protrusion 150 prevents foods stacked on the separator 120 from being damaged, and reflects light irradiated from a lateral side inward of the box 110.

If transmission holes are formed in the box 110, holes are formed in the same size as that of the transmission holes in the reflective member 140 around the positions of the transmission holes, so that the reflective member 140 can transmit external light.

Figure 17:
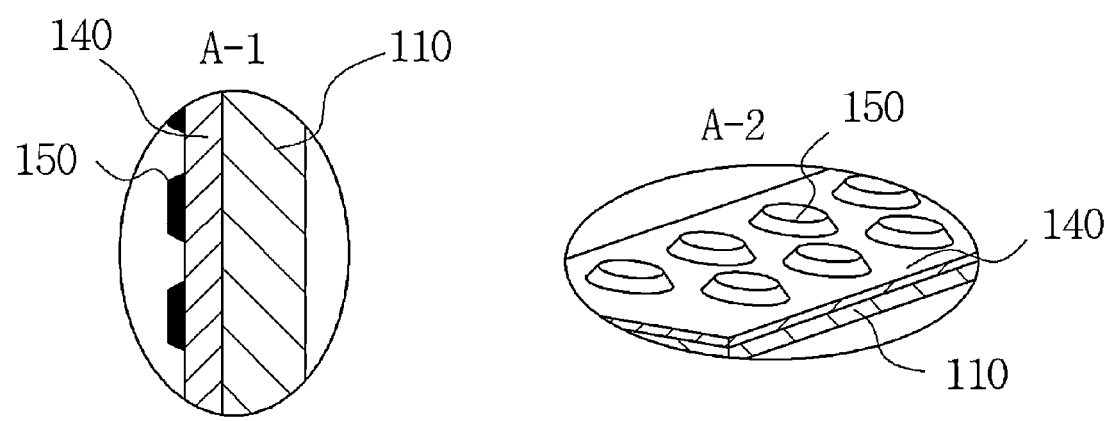
FIG. 17 is a view showing a part 'A' of FIG. 16.

In addition, as shown in FIG. 17, a plurality of separators 120 are coupled with an intermediate portion of the box 110 to separate foods at an upper layer from foods at a lower layer, so that foods are stacked in a layer structure when the foods are stacked.

The separator 120 includes a reflective material and the reflective protrusions 150 are formed on both surfaces of the separator 120, so that the light irradiated from the illumination unit 130 may be diffusion-reflected.

The reflective protrusion 150 of the separator 120 has a circular shape, an oval shape, or a polygonal shape when viewed in a plan view, and has a parallelogram shape when viewed in a side sectional view, so that the reflective protrusion 150 prevents foods stacked on the separator 120 from being damaged, and reflects light irradiated from a lateral side inward of the box 110.

The separator 120 may be selectively installed if necessary.

If the reflective member 140 is installed on the inner wall surface of the box 110, illumination units 130 are installed on an inner lateral side of the reflective member 140 and corners at which the separator 120 is installed.

Figure 18:
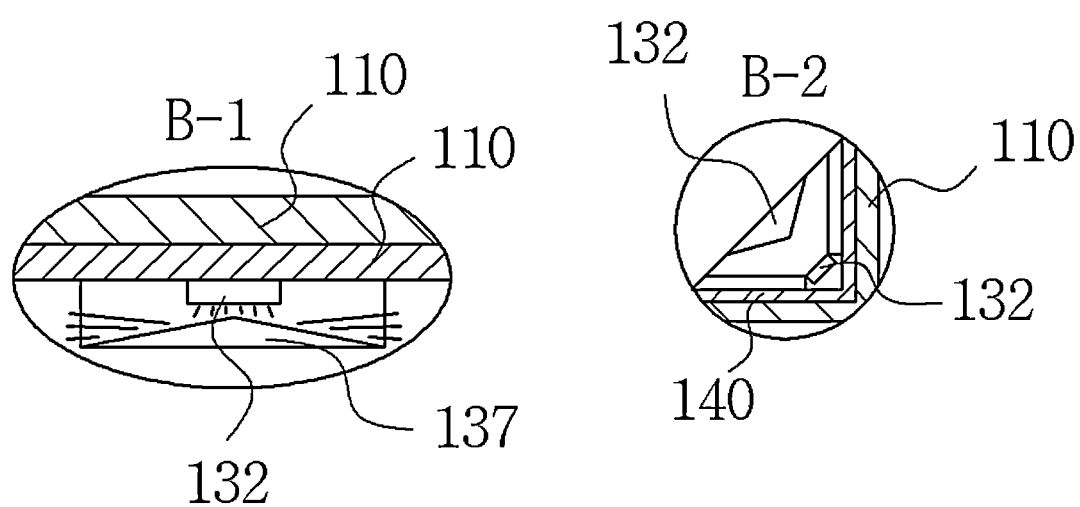
FIG. 18 is a view showing a part 'B' of FIG. 16.

As shown in FIGS. 14, 15, and 18, the illumination unit 20 is provided in the shape of a stripe, or a triangular horn piece, so that the illumination unit 20 may be attached on the inner wall surface or at the corner of the box 10. If the separator 120 is installed, the illumination unit 130 may be installed at the corner in which the separator 120 is installed.

Figure 19:
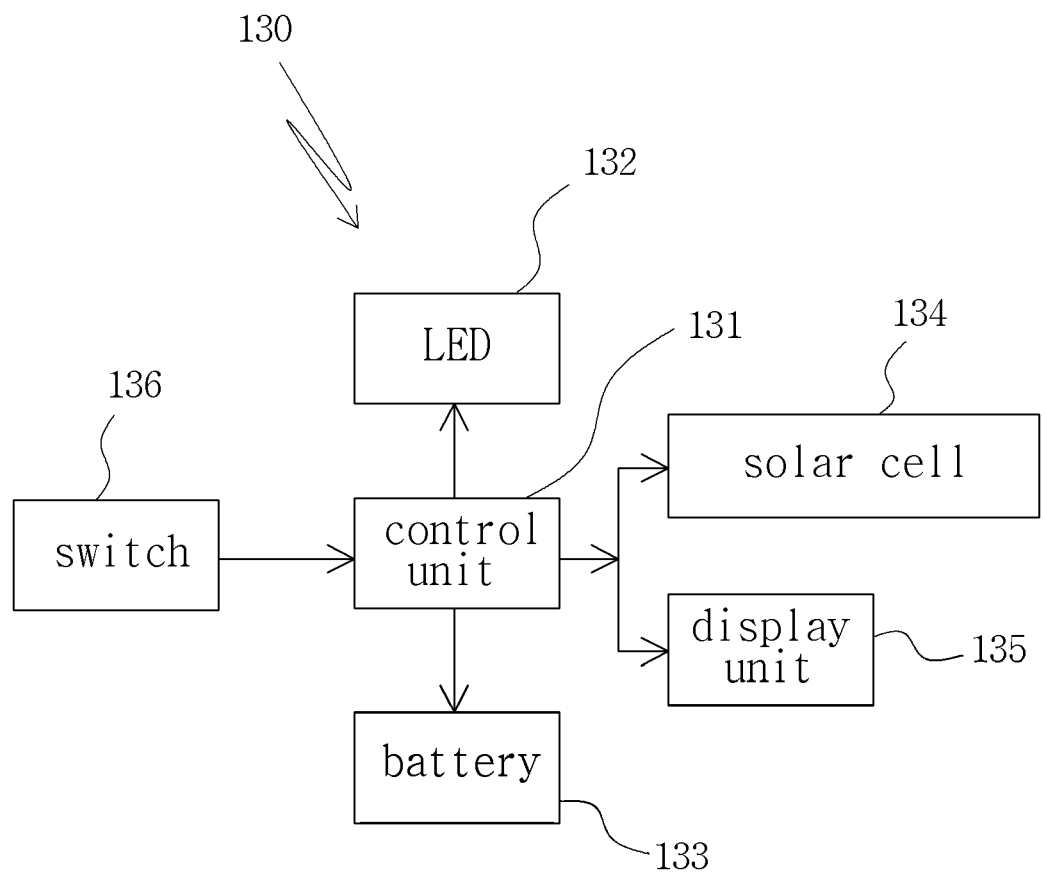
FIG. 19 is a block view showing an illumination unit in the preservation apparatus for improving food storage performance according to another embodiment of the present invention.

As shown in FIG. 19, the illumination unit 130 includes an LED 132 to irradiate light, a solar cell 134 to generate power by sunlight, a battery 133 to apply power to the LED 132 and to charge power generated from the solar cell 134, a display unit 135 to display an operating state of the LED 132, and a control unit 131 connected with the LED 132, the display unit 135, the solar cell 134, and the battery 133 to control the LED 132, the display unit 135, the solar cell 134, and the battery 133 by a control signal, and a switch 136 to transmit an external input to the control unit 131.

The LED 132 may include LEDs 132 representing various colors so that the light having the wavelength of 320-850 nm can be irradiated.

The colors represented by the LEDs 132 are combined with each other so that light having the wavelength of 320-850 nm can be created.

The LED 132 includes an SMD type of LED to occupy the minimum space and is prevented from being in contact with the foods stored in the box 110.

The solar cell 134, the display unit 135, and the switch 136 are installed on an outer surface of the box 110, and the solar cell 134 generate power by external light to supply the power to the control unit 131 or the battery 133. The display unit 135 displays the operating state of the LED 132 and the state of the battery 133.

The switch 136 transmits an input value input by a user at the outside, so that the control unit 131 controls the set operations of the LED 132 and the display unit 135.

The control unit 131 is connected with the LED 132, the display unit 135, the solar cell 134, the switch 136, and the battery 133 to operate the LED 132 by using a set value corresponding to an external signal input through the switch 136. Simultaneously, the control unit 131 transmits a signal to display the operating states of the LEDs 132, which are currently operated, to the display unit 135, and the display unit 135, which has received the display signal of the control unit 131, displays the operating states of the LEDs 132.

In addition, the control unit 131 detects a charge quantity of the battery 133 and transmits the charge quantity to the display unit 135. The display unit, which has received a display signal of the control unit 131, displays the charge quantity of the battery 133.

In this case, the control unit 131 operates the LED 132 by using preset values representing the color of the LED 132, the operating state of the LED 132, and the operating time of the LED 132 according to the input signal input by the user through the switch 136. Accordingly, the control unit 131 transmits the operating state of the LED 132 to the display unit 135, so that the display unit 135 displays the operating state of the LED 132.

In addition, simultaneously, the control unit 131 detects the charge quantity of the battery 133 to apply power to the LED 132, the control unit 131, and the display unit 135, and transmits the charge quantity of the battery 133 to the display unit 135. The display unit 135 displays the charge quantity of the battery 133.

The illumination unit 130 irradiates light to the lateral side in order to prevent light from being directly irradiated onto the foods.

Accordingly, the light of the illumination unit 130 is irradiated onto the reflective protrusions 150 of the reflective member 140 or the separator 120, and the light irradiated onto the reflective protrusions 150 is diffusion-reflected through the reflective protrusion 150 and irradiated onto the foods.

The light of the illumination unit 130 is not directly irradiated onto the foods because light is irradiated onto only a portion of stacked foods when the light is directly irradiated onto the foods, so that a remaining portion the foods may not receive light.

Accordingly, the portion of the foods, which has received light, can be preserved for a long time, but the remaining portion of the food, which does not receive the light, is preserved for a short time. Therefore, the remaining portion of the foods, which does not receive the light, may be decayed.

To this end, as shown in FIG. 18, the illumination unit 130 is provided with a reflective plate 137 having an inclination angle to reflect light irradiated from the LED 132 to the lateral side, so that the light of the LED 132 is irradiated to the lateral side. In the reflective plate 137, an angle to reflect light is varied depending on the shapes and the positions of the illumination unit 130.

If the illumination unit 130 is provided in the shape of the stripe and installed on the wall surface of the box 110, the reflective plate 137 is inclined in the shape of a triangular horn to reflect light to both lateral sides, so that the light is irradiated onto the foods through the reflective member 140 or the separator 120.

In addition, if the illumination unit 130 is provided in the shape of the triangular horn piece, the reflective plate 137 may be diagonally installed at the front of the LED 132 to reflect the light irradiated from the LED 132 of the illumination unit 130 toward the reflective protrusion 150 of the reflective member 140 or the separator 120.

As described above, the reflective plate 137 is installed in the illumination unit 130, so that the number of illumination units 130 installed in the box 110 can be reduced. In addition, the light from the illumination unit 130 can irradiated to the lateral side so that the light can be uniformly irradiated onto the foods through the reflective protrusion 150 of the reflective member 140 or the separator 120.

An optical cable is connected with the illumination unit 130 so that light may be transmitted and irradiated to an inner region of the box 10, which the light generated from the illumination unit 20 does not reach, through the optical cable.

In addition, since the light from the illumination unit 130 may be transmitted to a long distance through the optical cable, the number of illumination units 130 may be reduced to a minimum, so that only the minimum number of the illumination units 20 may be installed and used.

Hereinafter, another embodiment of the present invention will be described.

The reflective member 140 having the same shape as that of the inner wall surface of the box 110 is inserted and installed in the inner wall surface of the box 110 used to transfer or store foods under a room-temperature or low-temperature environment. The illumination unit 130, which is provided in the shape of a stripe or a triangular horn piece, is installed inside the reflective member 140.

In this case, the reflective protrusion 150 protrudes inward of a front surface of the reflective member 140 to diffusion-reflect the light of the illumination unit 130. To this end, the reflective plate 137 is installed in the illumination unit 130, so that the light from the illumination unit 130 is bent and irradiated onto the reflective member 140 or the reflective protrusion 150 of the separator 120.

A plurality of separators 120 are installed while crossing an intermediate portion of the box 110 to separate foods at an upper layer from foods at a lower layer. The separators 120 include a reflective material so that the light from the illumination unit 130 is reflected to irradiate onto the foods. The reflective protrusions 150 are formed at both lateral sides of the separator 120, so that the light irradiated from the illumination unit 130 is diffusion-reflected to the foods.

In addition, a plurality of illumination units 130 having the shape of a stripe or a cone are installed inside the box 110, and the control unit 131, the solar cell 134, the display unit 135, the battery 133, and the switch 136 are modularized and installed outside the box 110. The LED 132 is connected with the control unit 131, so that the LED 132 and the display unit 135 are operated by using preset values in the control unit 131 according to an external input signal which is input through the switch 136.

In this case, the LED 132 is operated as follows by the control unit 131.

If the color and the irradiation time of the LED 132 required by a user are input through the input signal of the switch 136, the LED 132 is operated by using the preset values in the control unit 131 according to a related operating signal.

In addition, the state of the LED 132 is transmitted from the control unit 131 to the display unit 135, so that the present color and the present operating time of the LED 132 are displayed on the display unit 135.

Further, the display unit 135 displays the charge quantity of the battery 133 detected by the control unit 131 based on the display signal of the control unit 131.

The battery 133 is continuously charged through the solar cell 134 if there is sunlight.

In other words, the control unit 131 operates the LED 132 through a control signal according to the color of the LED 132 and the operating time of the LED 132 input to the control unit 131 through the switch 136 by the user. The color and the operating time of the LED 132 are displayed on the display unit 135 through the display signal transmitted from the control unit 131, and the charge quantity of the battery 133 detected by the control unit 131 is displayed on the display unit 135.

Power generated from the solar cell 134 is charged in the battery 133 through the input of the switch 136 or the power is directly applied to the control unit 131 to operate the LED 132.

As described above, according to the present invention, in order to improve the storage performance of foods when foods stored in a box are transferred or preserved, the reflective member is coupled with the inner wall surface of the box, and the illumination unit is installed in the box. Accordingly, the storage performance of the foods can be improved by light having a specific wavelength, which is irradiated from the illumination unit.

Although the preservation apparatus for improving food storage performance according to the exemplary embodiments of the present invention have been described, it is understood that the present invention should not be limited to these exemplary embodiments but various changes and modifications can be made by those skilled in the art within the spirit and scope of the present invention as hereinafter claimed.

The invention claimed is:

1. A preservation apparatus for improving food storage performance, the preservation apparatus comprising:
    a box in which foods are stored;
    an illumination unit inserted and installed into the box to irradiate light having a specific wavelength onto the foods stored in the box;
    a reflective member coupled with an inner front surface of the box through insertion into the box, having a plurality of reflective protrusions to diffusion-reflect the light from the illumination unit, and including a reflective material; and
    a plurality of separators crossing an intermediate portion of the box to divide the foods stacked in the box into upper foods and lower foods and including a reflective material to reflect the light from the illumination unit,
    wherein the box includes transmission holes disposed in both lateral sides thereof, and the transmission holes are coupled with films such that the light having the specific wavelength is transmitted into the box.

2. The preservation apparatus of claim 1, wherein the illumination unit comprises:
    a LED to irradiate the light having the specific wavelength into the box;
    a solar cell installed at an outer surface of the box to generate power by using sunlight;
    a battery to apply power to the LED and charged with the power generated from the solar cell;
    a display unit to display an operating state of the LED;
    a control unit connected with the LED, the display unit, the solar cell, and the battery to operate the LED and the display unit by using a set value; and
    a switch connected with the control unit to transmit an external input to the control unit.

3. The preservation apparatus of claim 2, further comprising a reflective plate disposed at a front surface of the LED to refract light such that the light is irradiated to a lateral side.

4. The preservation apparatus of claim 1, wherein the illumination unit is in a shape of a stripe or a triangular horn piece and attached to an inner wall surface or a corner of the box.

5. The preservation apparatus of claim 1, wherein the reflective protrusions of the reflective member are in a polygonal shape, a circular shape, or an oval shape when viewed in a plan view, and in a parallelogram shape when viewed in a side sectional view to prevent the foods from being damaged.

6. The preservation apparatus of claim 1, wherein the light from the illumination unit has a wavelength in a range of 320 nm to 850 nm.

7. The preservation apparatus of claim 1, further comprising an optical cable connected with the illumination unit such that the light from the illumination unit is supplied to the foods positioned into the box and irradiated onto the foods.

\* \* \* \* \*